(12) United States Patent
Kim et al.

(10) Patent No.: US 11,852,847 B2
(45) Date of Patent: Dec. 26, 2023

(54) MAXWELLIAN VIEW DISPLAY APPLYING SPACE-TIME MULTIPLEXING METHOD

(71) Applicant: Korea Electronics Technology Institute, Seongnam-si (KR)

(72) Inventors: Young Min Kim, Seoul (KR); Ji Soo Hong, Seoul (KR); Hoon Jong Kang, Goyang-si (KR); Sung Hee Hong, Seoul (KR); Choon Sung Shin, Seoul (KR)

(73) Assignee: KOREA ELECTRONICS TECHNOLOGY INSTITUTE, Seongnam-si (KR)

(*) Notice: Subject to any disclaimer, the term of this patent is extended or adjusted under 35 U.S.C. 154(b) by 604 days.

(21) Appl. No.: 16/969,666

(22) PCT Filed: Feb. 13, 2018

(86) PCT No.: PCT/KR2018/001875
§ 371 (c)(1),
(2) Date: Aug. 13, 2020

(87) PCT Pub. No.: WO2019/160169
PCT Pub. Date: Aug. 22, 2019

(65) Prior Publication Data
US 2020/0400967 A1 Dec. 24, 2020

(30) Foreign Application Priority Data
Feb. 13, 2018 (KR) .................. 10-2018-0017390

(51) Int. Cl.
*G02B 26/08* (2006.01)
*G02B 30/33* (2020.01)
*G02B 27/30* (2006.01)

(52) U.S. Cl.
CPC ......... *G02B 30/33* (2020.01); *G02B 26/0816* (2013.01); *G02B 27/30* (2013.01)

(58) Field of Classification Search
CPC .... G02B 30/33; G02B 26/0816; G02B 27/30; G02B 27/22
See application file for complete search history.

(56) References Cited

U.S. PATENT DOCUMENTS 5,428,366 A * 6/1995 Eichenlaub ........ G02B 27/0093
348/E13.028
2008/0266530 A1 10/2008 Takahashi et al.
(Continued)

FOREIGN PATENT DOCUMENTS

KR 10-2018-0009568 A 1/2018
WO 2006-038662 A1 4/2006

OTHER PUBLICATIONS

International Search Report dated Nov. 16, 2018, in connection with corresponding International Patent Application No. PCT/KR2018/001875, citing the above references.
(Continued)

*Primary Examiner* — Euncha P Cherry
(74) *Attorney, Agent, or Firm* — Hauptman Ham, LLP (57) ABSTRACT

Provided is a Maxwellian view display which uses a space-time multiplexing scheme and widens a field of view, thereby having a degree of freedom within a set area instead of a fixed position while maintaining the advantage of the existing Maxwellian view, in which a clear image can be observed irrespective of the difference in individual ability for focal point adjustment since the focal point does not need to be adjusted. According to an embodiment of the present invention, a display includes: a light source unit for changing the position of a point light source according to time; a first lens for converting the light emitted from the light source unit to be parallel; an image generating unit for
(Continued)

generating an image using the parallel light incident from the first lens; and a second lens for focusing the image generated by the image generating unit.

8 Claims, 7 Drawing Sheets

(56) References Cited

U.S. PATENT DOCUMENTS

| | | | |
|---|---|---|---|
| 2012/0008181 A1* | 1/2012 | Cable | G03H 1/2294 359/9 |
| 2014/0177017 A1* | 6/2014 | Kubota | G02B 27/017 359/13 |
| 2016/0320620 A1 | 11/2016 | Maimone | |

OTHER PUBLICATIONS

Korean Office Action dated Feb. 7, 2019, in connection with corresponding Korean Patent Application No. 10-2018-0017390, citing the above references.

* cited by examiner

Arrangement of point light source (2 dimensions)

Order of turning on point light source

Arrangement of point light source (3 dimensions)

Order of turning on point light source

MAXWELLIAN VIEW DISPLAY APPLYING SPACE-TIME MULTIPLEXING METHOD

CROSS-REFERENCE TO RELATED APPLICATION

The present application is a national stage filing under 35 U.S.C § 371 of PCT application number PCT/KR2018/001875 filed on Feb. 13, 2018 which is based upon and claims the benefit of priorities to Korean Patent Application No. 10-2018-0017390, filed on Feb. 13, 2018, in the Korean Intellectual Property Office, which are incorporated herein in their entireties by reference.

TECHNICAL FIELD

The present disclosure relates to three-dimensional (3D) image display technology, and more particularly, to a Maxwellian view display suggested to overcome vergence-accommodation conflict.

BACKGROUND ART

Vergence-accommodation conflict, which is one of the causes of visual fatigue in 3D display, is the problem that should be solved by all 3D displays currently researched or manufactured, except for holographic displays, some light field displays, and super multi-view display schemes.

To overcome the problem of the vergence-accommodation conflict that typical 3D display schemes have, Maxwellian view was suggested by James Clerk in 1868.

Figure 1:
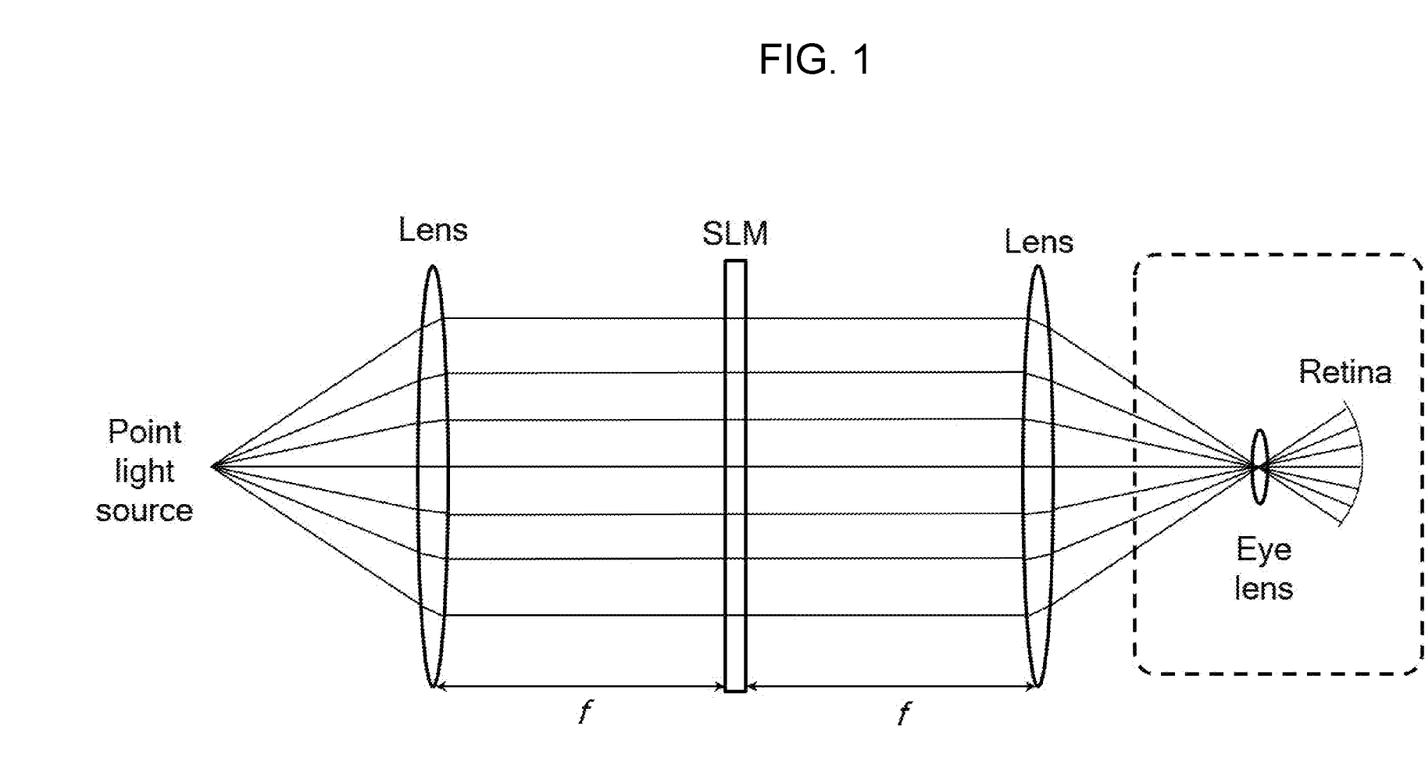
FIG. 1 is a view illustrating the principle of a normal Maxwellian view.
Figure 2:
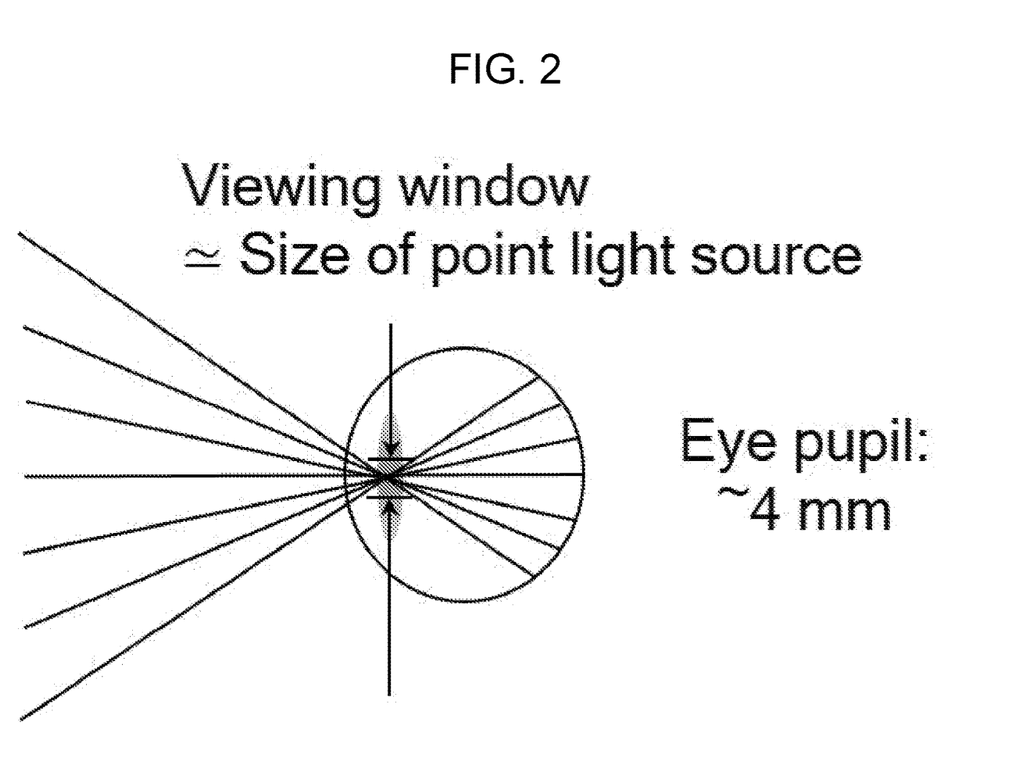
FIG. 2 is a view provided to explain a disadvantage of the normal Maxwellian view.

FIG. 1 is a view illustrating the principle of a typical Maxwellian view. As shown in FIG. 1, the Maxwellian view refers to a system whereby light emitted from a point light source passes through one pair of lens groups, and is modulated into a light image at a spatial light modulator (the spatial light modulator used in the Maxwellian view is typically of a transmission type, but a reflection-type spatial light modulator may be used by changing or adding an optical design) disposed between the lens groups, and the modulated light image converges at one point (in general, it is assumed that the light image converges at the human crystalline lens), and finally is projected on the retina.

In a normal 3D display, if convergence-accommodation conflict occurs since the human eyes are focused onto a surface where an image exists but a real image is actually expressed on a display surface, the Maxwellian view theoretically enables a 3D display having no problem in focus adjustment to be realized.

However, the Maxwellian view described above has the following disadvantages. In FIG. 1, since beams converging at the crystalline lens theoretically start from the point light source, their size (viewing window) is very small.

Specifically, on the assumption that a pupil size of human eye is 3-4 mm, the Maxwellian view, which does not require focus adjustment, will be formed only if the bundle of beams starting from the point light source should all be collected within the human pupil.

Under normal circumstances, however, it takes much time to find a viewing window in order to view the Maxwellian view according to a pupil size, or even if a viewing window is found and the Maxwellian view is viewed, there is a disadvantage that an image should be viewed at a fixed position without a degree of freedom of a point of view.

As described above, the Maxwellian view has advantages that focus adjustment is not required, and a clean image can be observed irrespective of individual differences in focus adjustment ability, but has a disadvantage that the image should be viewed at a fixed position without a degree of freedom of a point of view.

DISCLOSURE

Technical Problem

The present disclosure has been developed in order to address the above-discussed deficiencies of the prior art, and an object of the present disclosure is to provide a Maxwellian view display which widens a field of view by using a space-time multiplexing scheme, thereby having a degree of freedom with a predetermined area instead of a fixed position, while maintaining the advantage of the related-art Maxwellian view that focus adjustment is not required and a clean image can be observed irrespective of individual differences in focus adjustment ability.

Technical Solution

According to an embodiment of the present disclosure to achieve the above-described object, a display includes: a light source unit configured to change a position of a point light source according to time; a first lens configured to convert light emitted from the light source unit into parallel light; an image generator configured to generate an image by using the parallel light entering from the first lens; and a second lens configured to focus the image generated in the image generator.

The light source unit may change the position of the point light source according to time by turning on a plurality of point light source elements one by one in sequence.

The point light source elements may be arranged in a ring form.

The point light source elements may be arranged in a matrix form.

The point light source elements may be arranged three-dimensionally.

The light source unit may change the position of the point light source according to time by reflecting light emitted from a single point light source element at different angles in sequence.

The second lens may focus the image generated in the image generator at a single point.

The image generator may synchronize an image generation position in association with a change of the position of the point light source.

The image generator may be a spatial light modulator to generate an image by modulating the parallel light entering from the first lens.

According to another embodiment of the present disclosure, a display method may include; changing, by a light source unit, a position of a point light source according to time; converting, by a first lens, light emitted from the light source unit in parallel light; generating, by an image generator, an image by using the parallel light entering from the first lens; and focusing, by a second lens, the image generated by the image generator.

According to still another embodiment of the present disclosure, a display system may include: a light source unit configured to change a position of a point light source according to time; a first lens configured to convert light emitted from the light source unit into parallel light; an image generator configured to generate an image by using the parallel light entering from the first lens; a second lens configured to focus the image generated in the image generator; and an image provider configured to provide a source of an image to be generated in the image generator.

According to yet another embodiment of the present disclosure, a display method may include; changing, by a light source unit, a position of a point light source according to time; converting, by a first lens, light emitted from the light source unit into parallel light; providing, by an image provider, a source of an image to an image generator; generating, by the image generator, an image by using the parallel light entering from the first lens; and focusing, by a second lens, the image generated in the image generator.

Advantageous Effects

According to embodiments of the present disclosure as described above, a clean image can be observed irrespective of individual differences in focus adjustment ability, which is the advantage of the related-art Maxwellian view, and also, an image that may be observed only from a fixed point of view, which is the disadvantage of the related-art Maxwellian view, can be clearly observed from an area having a predetermined range of degree of freedom, irrespective of individual difference in focus adjustment ability.

BEST MODE

Hereinafter, the present disclosure will be described in detail with reference to the accompanying drawings.

Normal characteristics of the Maxwellian view are that a bundle of beams starting from a point light source is modulated through one pair of lenses and a spatial light modulator positioned between the lenses, and the modulated bundle of beams converges at one point and is viewed by an observer through his or her pupils.

Accordingly, the modulated bundle of beams should converge within a small size of the pupil when converging at one point, and an image projected on the retina through this is recognized by the observer. Therefore, this method can make it possible for the observer to clearly view an object within a viewing distance irrespective of observer's focus adjustment ability.

However, since the bundle of beams should converge within the small size of the pupil, a degree of freedom of a point of view is very limited, and it may even take much time to find an exact position.

Therefore, embodiments of the present disclosure suggest a Maxwellian view method applying a space-time multiplexing method to have the advantage of the related-art Maxwellian view, while giving a degree of freedom to a limited point of view and widening a viewing area.

Figure 3:
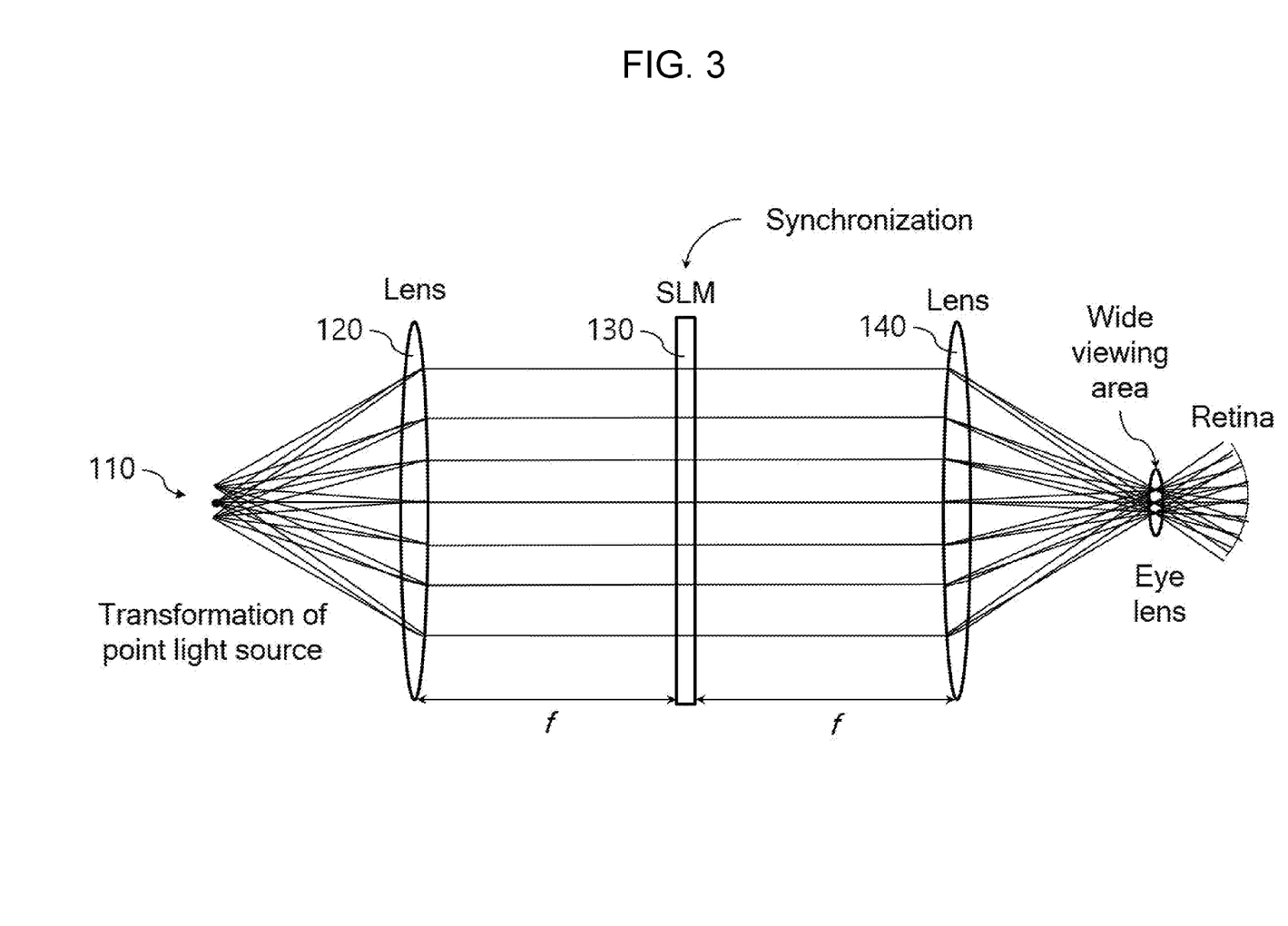
FIG. 3 is a view illustrating a Maxwellian view display according to an embodiment of the present disclosure.

FIG. 3 is a view illustrating a Maxwellian view display according to an embodiment of the present disclosure.

The Maxwellian view display according to an embodiment of the present disclosure includes a light source unit 110, a lens-1 120, a spatial light modulator (SLM) 130, and a lens-2 140, as shown in FIG. 3.

The light source unit 110 is a light source means for changing a position of a point light source according to time. To achieve this, the light source unit 110 includes a plurality of point light source elements, and changes the position of the point light source according to time by turning on the point light source elements one by one in sequence.

The related-art Maxwellian view display uses a single point light source, and the Maxwellian view display according to an embodiment of the present disclosure differs therefrom in that it changes the position of the point light source at intervals, and through this, a field of view of the Maxwellian view can be widened.

On the right side of FIG. 3, it is illustrated that a viewing range of the Maxwellian view increases by moving the position of the point light source by using a space-time multiplexing method. In this case, preferably, a speed for moving the point light source by using the space-time multiplexing method may be maintained at 60 Hz or higher in consideration of an afterimage effect.

A detailed structure of the light source unit 110 will be described below with reference to FIGS. 4 and 5.

The lens-1 120 is a collimating lens that converts light emitted from the light source unit 110 into parallel light.

The spatial light modulator 130 generates an image by using the parallel light entering from the lens-1 120. In generating the image, the spatial light modulator 130 synchronizes an image generation position in association with a change in the position of the point light source by the light source unit 110.

More specifically, the spatial light modulator 130 moves only the position of the same image and expresses the image in synchronization with a moving direction of the position of the point light source moved by the light source unit 110.

The lens-2 140 is a lens for focusing the image generated in the spatial light modulator 130 onto one point.

Figure 4:
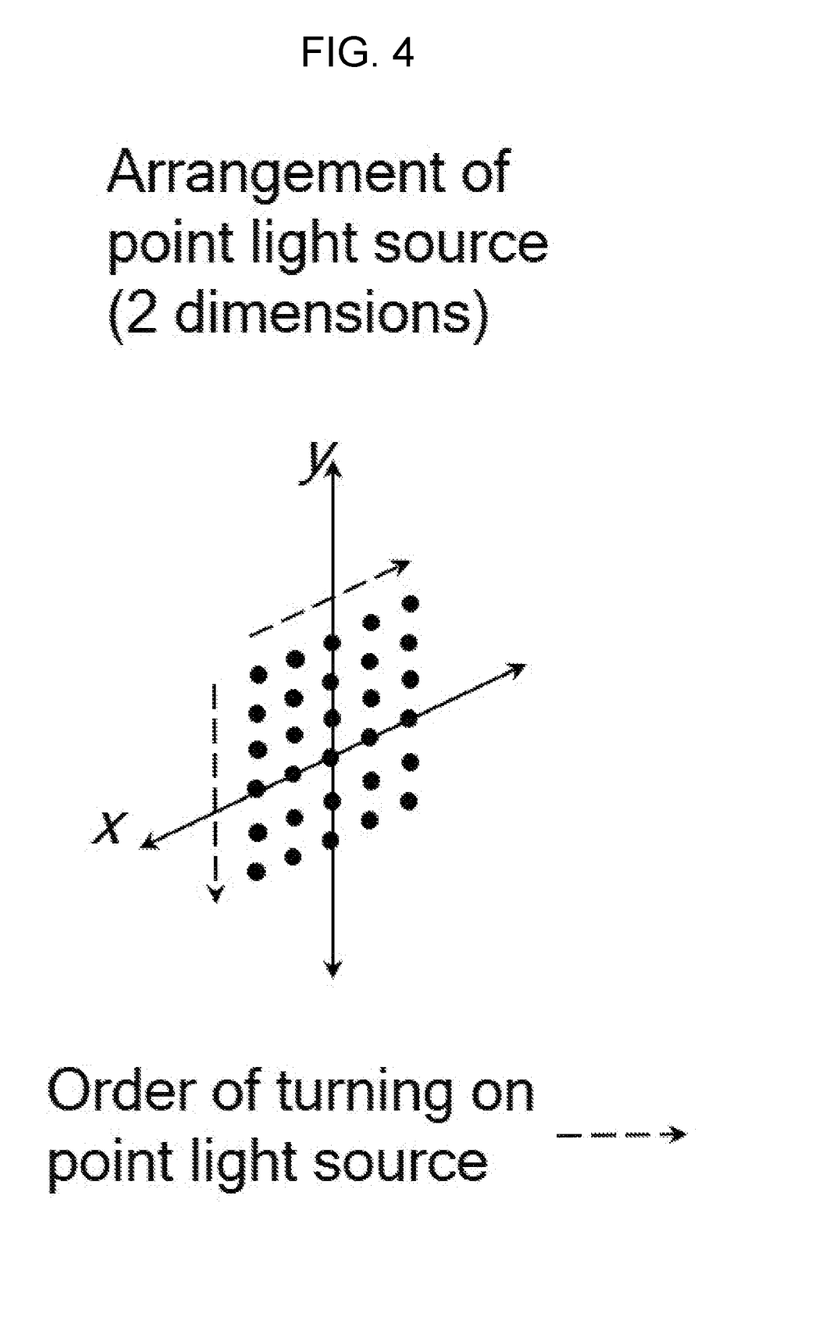
FIG. 4 is a view illustrating an implementation example of a light source unit shown in FIG. 3.

FIG. 4 is a view illustrating an implementation example of the above-described light source unit 110. As shown in FIG. 4, the light source unit 110 may be implemented with the point light source elements arranged in a matrix form, and may change the position of the point light source according to time by turning on the point light source elements one by one in sequence according to a scanning direction.

Figure 5:
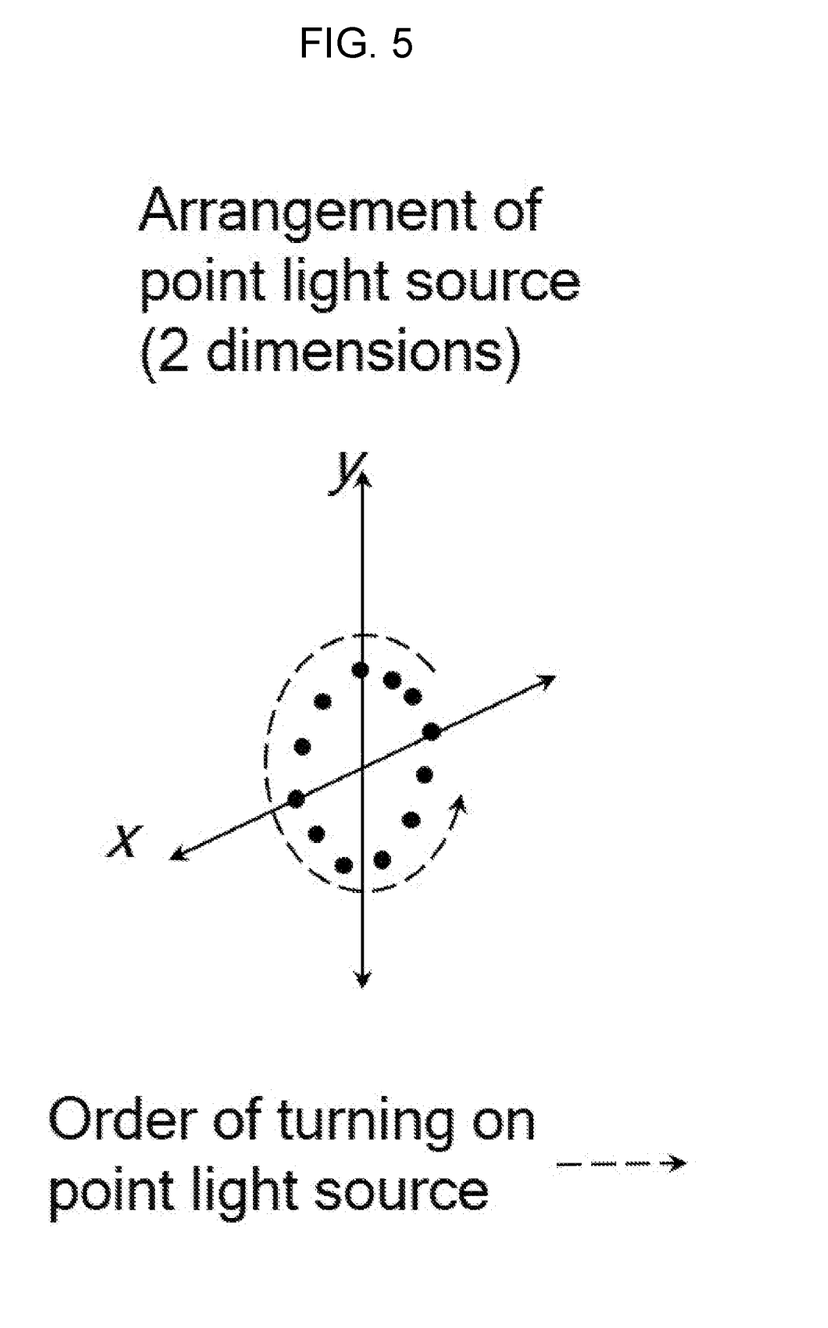
FIG. 5 is a view illustrating another implementation example of the light source unit of FIG. 3.

FIG. 5 is a view illustrating another implementation example of the above-described light source unit 110. As shown in FIG. 5, the light source unit 110 may be implemented with point light source elements arranged in a ring form, and may change the position of the point light source according to time by turning on the point light source elements one by one in sequence according to a clockwise direction or a counter clockwise direction.

Figure 6:
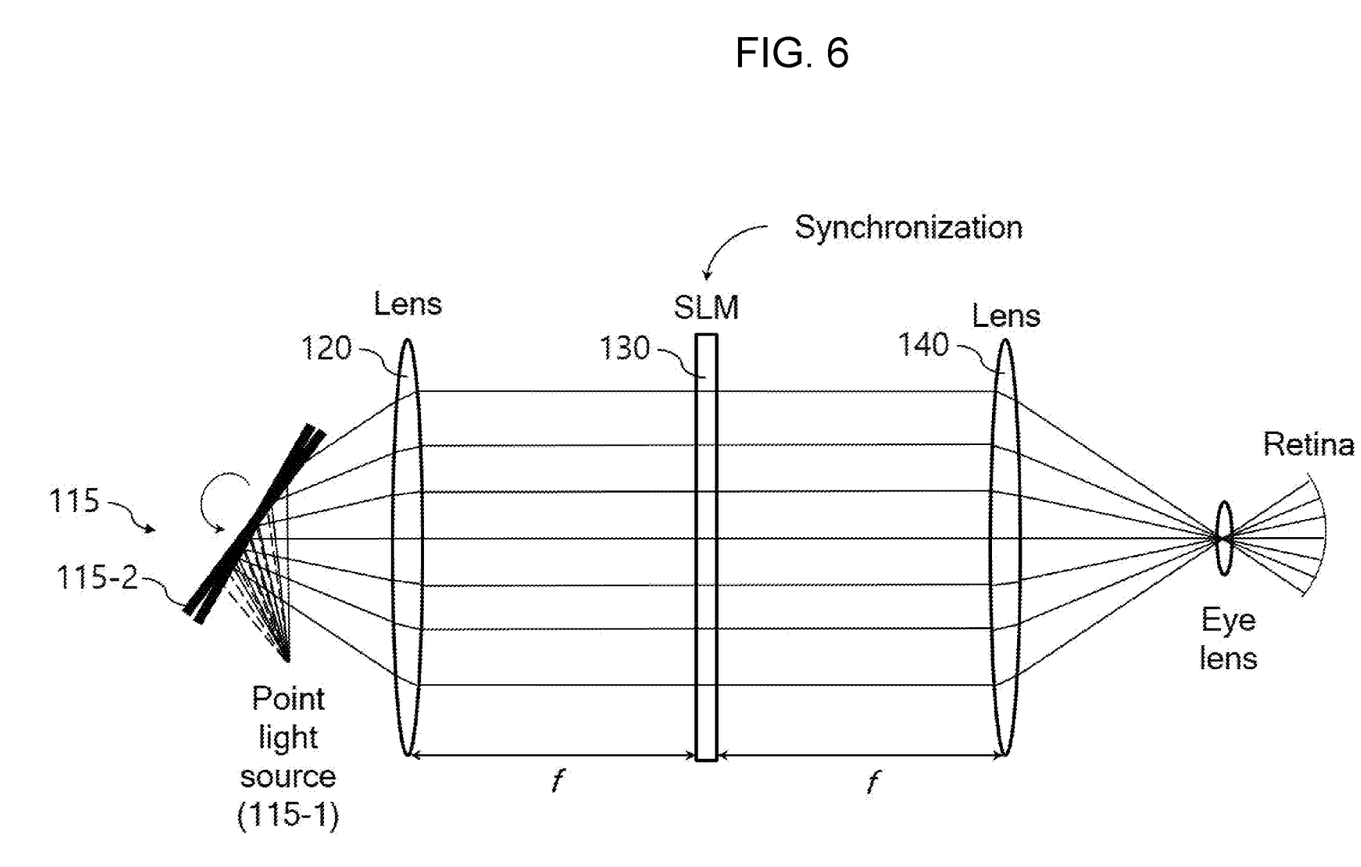
FIG. 6 is a view illustrating a Maxwellian view display according to another embodiment of the present disclosure.

FIG. 6 is a view illustrating a Maxwellian view display according to another embodiment of the present disclosure.

From among components of the Maxwellian view display according to an embodiment of the present disclosure, the lens-1 120, the spatial light modulator 130, and the lens-2 140 are the same as the components of FIG. 3 described above, and thus a detailed description thereof is omitted.

A light source unit 115 includes a single point light source element 115-1 and a Galvano mirror 115-2. The light source unit 115 differs from the light source unit 110 of the above-described embodiment in that a single point light source element is provided.

The point light source element 115-1 is not moved and is fixed, and accordingly, emits light in a fixed direction.

The Galvano mirror 115-2 reflects light emitted from the point light source element 115-1 at different angles in sequence according to a scanning direction, thereby changing the position of the point light source according to time.

The field of view of the Maxwellian view may be widened through the method according to an embodiment of the present disclosure.

The scanning method using the Galvano mirror 115-2 uses, as a light scanning method, the method of changing the position of the point light source with the point light source being fixed, without moving the point light source, and in principle, achieves the same effect as when moving the light source, and has the advantage of being easier to synchronize or align with the spatial light modulator.

Up to now, the Maxwellian view display applying the space-time multiplexing method have been described with reference to preferred embodiments.

In the above-described embodiments, the light source units 110, 115 scan the point light source and change the position on a two-dimensional plane, but this is merely an example. The technical concept of the present disclosure may be applied to a case where the light source units 110, 115 scan the point light source and change the position in one dimension.

Furthermore, the light source unit 110 suggested in FIG. 3 may scan the point light source and change the position in a 3D space. An implementation example of the light source unit 110 to achieve this is illustrated in FIG. 7.

Figure 7:
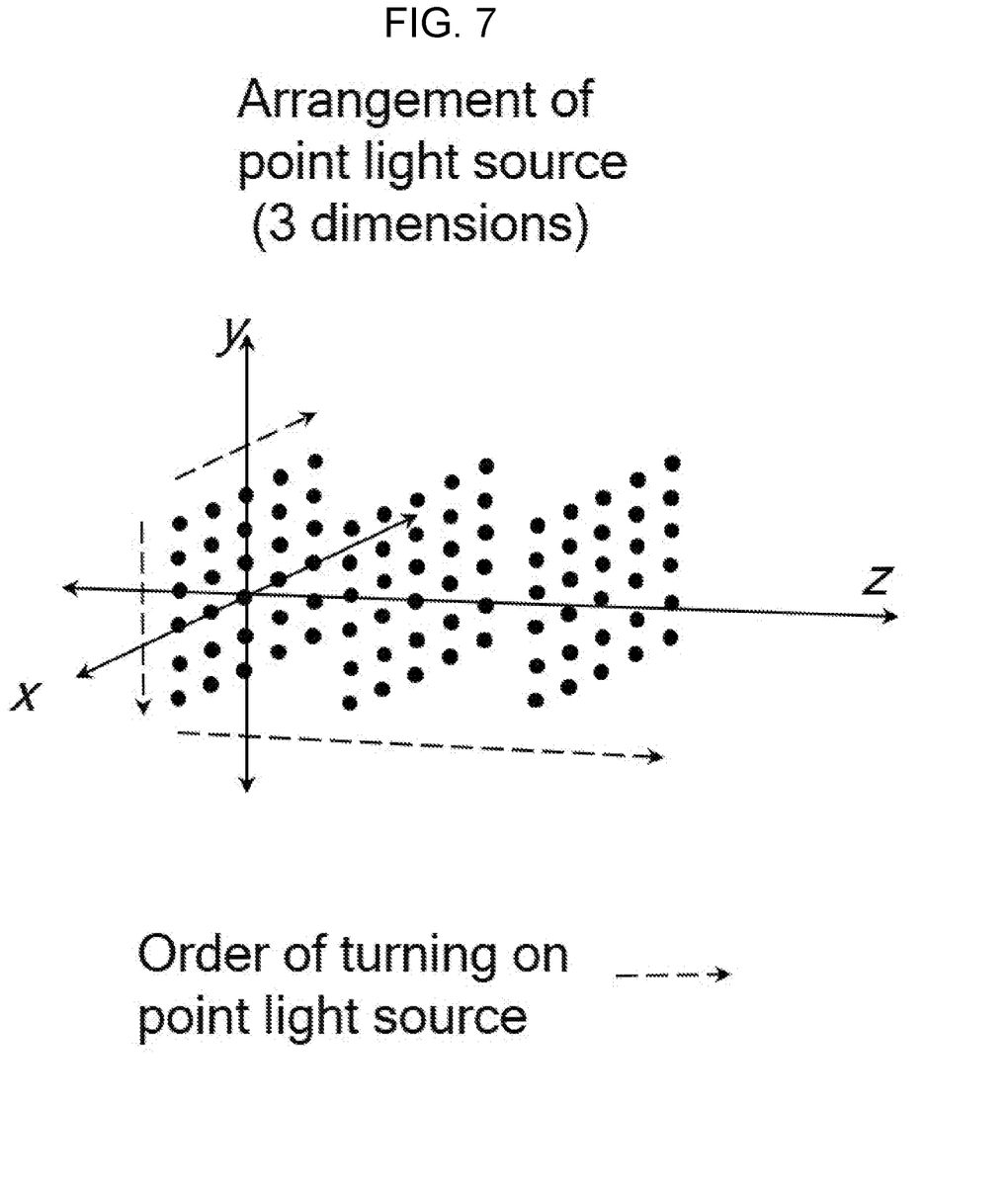
FIG. 7 is a view illustrating still another implementation example of the light source unit shown in FIG. 3.

As shown in FIG. 7, in the light source unit 110, surface light sources which have point light source elements arranged in a matrix form may be positioned differently positioned according to a light emitting direction, and a position and a depth of the point light source may be changed according to time by turning on the point light source elements one by one in sequence.

Specifically, the point light source elements arranged in the first surface light source are turned on one by one in sequence according to a scanning direction, the point light source elements arranged in the second surface light source are turned on one by one in sequence according to a scanning direction, the point light source elements arranged in the third surface light source are turned on one by one in sequence according to a scanning direction, and then the operation proceeds back to the first surface light source and repeats.

The spatial light modulator 130 of the Maxwellian view display may be substituted with another electronic element capable of generating an image.

In addition, the technical concept of the present disclosure may be applied to an image display system that is implemented to further include an image providing device providing a source of an image to be generated in the spatial light modulator 130 of the Maxwellian view display, although this image display system is not illustrated in the above-described embodiments.

Furthermore, the space-time multiplexing method applicable to the Maxwellian view display according to an embodiment of the present disclosure includes any method of changing the position of the point light source. For example, the space-time multiplexing method includes all of a method of rotating or changing the position of the point light source at intervals (60 Hz or higher, higher than or equal to a recognition speed of human's eyes), a method of achieving the same effect as space-time multiplexing by physically multiplexing a very small point light source, and a method of spatially multiplexing a single point light source by using a scanning method.

The Maxwellian view display according to an embodiment of the present disclosure has the advantage of the related-art Maxwellian view that focus adjustment is not required and a clear image can be observed irrespective of individual differences in focus adjustment ability, and also has the advantage that the Maxwellian view can be viewed with a degree of freedom within a predetermined area instead of a fixed position, by widening a field of view using the space-time multiplexing method.

Specifically, the Maxwellian view display according to an embodiment of the present disclosure uses the space-time multiplexing method to allow the bundle of beams starting from the point light source to start in various ranges, in order to overcome a limited viewing range of the related-art Maxwellian view, and also the bundle of beams converging through one pair of lens groups provides the Maxwellian view within a viewing range of a predetermined area having a degree of freedom, instead of at a single point, and accordingly, there is an advantage that the Maxwellian view can be observed within a viewing area of a predetermined range without focus adjustment.

Accordingly, a clean image can be observed irrespective of individual differences in focus adjustment ability, which is the advantage of the related-art Maxwellian view, and also, an image that may be observed only from a fixed point of view, which is the disadvantage of the related-art Maxwellian view, can be clearly observed from an area having a predetermined range of degree of freedom, irrespective of individual difference in focus adjustment ability.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical concept or prospect of the present disclosure.

The invention claimed is:

1. A display comprising:
    a light source unit including a plurality of point light source elements and configured to change a position of a point light source, among the plurality of point light source elements, according to time;

a first lens configured to convert light emitted from the point light source unit into parallel light;

an image generator configured to generate an image by using the parallel light entering from the first lens; and a second lens configured to focus the image generated in the image generator, wherein the light source unit is configured to sequentially turn on the plurality of point light source elements one by one to change the position of the point light source to be turned on, and wherein the second lens is configured to focus the image generated in the image generator at a single point.

2. The display of claim 1, wherein the plurality of point light source elements are arranged in a ring form.

3. The display of claim 1, wherein the plurality of point light source elements are arranged in a matrix form.

4. The display of claim 1, wherein the plurality of point light source elements are arranged three-dimensionally.

5. The display of claim 1, wherein the image generator is configured to synchronize an image generation position in association with a change of the position of the point light source.

6. The display of claim 5, wherein the image generator is a spatial light modulator configured to generate an image by modulating the parallel light entering from the first lens.

7. A display comprising:

a light source unit including a point light source element and a mirror and configured to change a position of a point light source according to time;

a first lens configured to convert light emitted from the point light source unit into parallel light;

an image generator configured to generate an image by using the parallel light entering from the first lens; and a second lens configured to focus the image generated in the image generator, wherein the light source unit is configured to change the position of the point light source according to time by changing an angle of the mirror so that mirror reflects light emitted from the point light source element at different angles in sequence, and wherein the second lens is configured to focus the image generated in the image generator at a single point.

8. A display method comprising:

changing, by a light source unit having a plurality of point light source elements, a position of a point light source according to time;

converting, by a first lens, light emitted from the light source unit in parallel light;

generating, by an image generator, an image by using the parallel light entering from the first lens; and focusing, by a second lens, the image generated by the image generator, wherein the light source unit sequentially turns on the plurality of point light source elements one by one to change the position of the point light source to be turned on, and wherein the second lens is configured to focus the image generated in the image generator at a single point.

\* \* \* \* \*